(12) United States Patent
Li et al.

(10) Patent No.: US 11,832,150 B2
(45) Date of Patent: *Nov. 28, 2023

(54) CALL RECORD SYNCHRONIZATION METHOD, CLOUD PLATFORM, AND TERMINAL

(71) Applicant: Huawei Technologies Co., Ltd., Shenzhen (CN)

(72) Inventors: Tao Li, Beijing (CN); Feng Li, Shenzhen (CN); Chenjian Zhao, Shenzhen (CN); Shaolong Wang, Shenzhen (CN); Wen Liu, Xi'an (CN); Chunlai Feng, Shenzhen (CN); Xiaolin Li, Dongguan (CN); Xutao Gao, Xi'an (CN); Wenhua Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/470,289

(22) Filed: Sep. 9, 2021

(65) Prior Publication Data

US 2022/0070631 A1 Mar. 3, 2022

Related U.S. Application Data

(63) Continuation of application No. 16/478,358, filed as application No. PCT/CN2017/077158 on Mar. 17, 2017, now Pat. No. 11,146,924.

(30) Foreign Application Priority Data

Jan. 16, 2017 (CN) .......................... 201710033515.5

(51) Int. Cl.
*H04W 4/16* (2009.01)
*H04W 68/00* (2009.01)
(Continued)

(52) U.S. Cl.
CPC ............... *H04W 4/16* (2013.01); *H04W 4/80* (2018.02); *H04W 68/005* (2013.01); *H04W 76/11* (2018.02); *H04W 92/18* (2013.01)

(58) Field of Classification Search
CPC ........ H04M 3/54; H04M 3/58; H04M 3/2218; H04M 19/04; H04W 4/16; H04W 4/80; H04W 8/205; H04W 68/005; H04W 92/18
(Continued)

(56) References Cited

U.S. PATENT DOCUMENTS 8,010,158 B2 8/2011 Parkkinen et al.
2006/0276179 A1 12/2006 Ghaffari et al.
(Continued)

FOREIGN PATENT DOCUMENTS

CN 101123637 A 2/2008
CN 101257679 A 9/2008
(Continued)

*Primary Examiner* — Harun Chowdhury
(74) *Attorney, Agent, or Firm* — Conley Rose, P.C.

(57) ABSTRACT

Embodiments of the present invention relate to a call record synchronization method, a cloud platform, and a terminal. The method includes: detecting, by a first terminal, an input operation for requesting to display a call record; and after the first terminal detects the input operation, displaying, by the first terminal, a merged call record, where the merged call record is a call record obtained after merging of a call record of the first terminal and a call record of a second terminal, and the merged call record includes a device identifier of the first terminal and/or a device identifier of the second terminal. According to the embodiments of the present invention, a user can use the merged call record to identify call answering or making statuses on a plurality of terminals, without querying a plurality of call records. This improves user experience.

20 Claims, 15 Drawing Sheets

(51) Int. Cl.
*H04W 4/80* (2018.01)
*H04W 76/11* (2018.01)
*H04W 92/18* (2009.01)

(58) Field of Classification Search
USPC .............. 370/254, 260, 278; 455/426.1, 558
See application file for complete search history.

(56) References Cited

U.S. PATENT DOCUMENTS

| | | | |
|---|---|---|---|
| 2009/0163244 A1* | 6/2009 | Parkkinen | H04M 1/72406 455/558 |
| 2012/0238262 A1 | 9/2012 | Goren | |
| 2015/0222744 A1* | 8/2015 | Azim | H04M 3/2218 379/140 |
| 2016/0036476 A1* | 2/2016 | Cho | H04M 3/54 455/558 |
| 2017/0031556 A1* | 2/2017 | Yang | H04M 19/04 |
| 2019/0373422 A1 | 12/2019 | Li et al. | |

FOREIGN PATENT DOCUMENTS

| | | |
|---|---|---|
| CN | 101631339 A | 1/2010 |
| CN | 102857564 A | 1/2013 |
| CN | 103051762 A | 4/2013 |
| CN | 104754096 A | 7/2015 |
| CN | 106027738 A | 10/2016 |
| CN | 106211112 A | 12/2016 |
| CN | 108605207 A | 9/2018 |
| KR | 101531179 B1 | 6/2015 |

* cited by examiner

CALL RECORD SYNCHRONIZATION METHOD, CLOUD PLATFORM, AND TERMINAL

This application is a continuation of U.S. patent application Ser. No. 16/478,358, filed on Jul. 16, 2019, which is a National Stage of International Application No. PCT/CN2017/077158, filed on Mar. 17, 2017. The International Application claims priority to Chinese Patent Application No. 201710033515.5, filed on Jan. 16, 2017. All of the aforementioned patent applications are hereby incorporated by reference in their entireties.

TECHNICAL FIELD

Embodiments of the present invention relate to the communications field, and in particular, to a call record synchronization method, a cloud platform, and a terminal.

BACKGROUND

With development of smart wearable products and tablet products, watches and tablet products that can be independently connected to operator networks and can be used to make and answer calls have emerged, for example, watches having a subscriber identity module (Subscriber Identification Module, SIM) card or an embedded SIM (Embedded SIM, eSIM) card and tablet products that support voice over Wireless Fidelity (Voice over WiFi, VoWiFi) transmission. The eSIM card is also referred to as a virtual SIM card or a programmable SIM card. Different from the conventional SIM card, the eSIM card is embedded directly on a chip of a device instead of being separately provided as an independent entity. The device may also be referred to as a terminal or a terminal device.

In view of the development, operators are actively promoting a one-number-multi-card service or a one-number-multi-terminal service. The one-number-multi-card service is a service provided by the operators. Specifically, one number is bound to a plurality of SIM cards (or eSIM cards), and when a call to the phone number is made, terminals with the SIM cards or eSIM cards bound to the number ring simultaneously. The terminals are similar to a plurality of telephone extensions. The one-number-multi-terminal service includes the one-number-multi-card service, and is an extension of the one-number-multi-card service. When a terminal does not support the SIM card or the eSIM card, an effect of the one-number-multi-card service can still be achieved in a WiFi network. For example, VoWiFi is an implementation of the one-number-multi-terminal service.

After a user subscribes to the one-number-multi-card service, a plurality of terminals using the service of multi-card (the SIM card or the eSIM card) with one number can share a primary number. It is assumed that the primary number for which the service is enabled is A. When a call to the user's number A is made, the plurality of terminals of the user ring simultaneously or ring successively, and the user may select any one of the terminals to answer the call. The user may also make a call on any terminal for which the one-number-multi-card service is enabled, and the outgoing call is displayed on a called party as a call from the user's primary number A. This leads to a problem of inconsistent call records on the plurality of terminals for which the one-number-multi-card service is enabled. For example, an incoming call record entry may be displayed on a watch as answered, but may be displayed on a mobile phone as not answered. Therefore, a mechanism for synchronizing a call record among different terminals is required, to ensure that the user views a same call record on different terminals, and can identify on which terminal a call is answered or made.

At present, there are mainly two types of mechanisms for synchronizing a call record among terminals: Bluetooth synchronization and cloud synchronization. In Bluetooth synchronization, when a mobile phone and a watch are within a Bluetooth connection range, and the mobile phone and the watch have been paired via Bluetooth, a call record may be synchronized via Bluetooth. In cloud synchronization, if both a mobile phone and a watch are connected to a cloud synchronization service, call records of terminals using a same cloud account may be synchronized by using the cloud service.

In Bluetooth synchronization, two terminals need to be within a specific range, and once the range exceeds an effective range of Bluetooth transmission, Bluetooth synchronization cannot run. In cloud synchronization, call records of different terminals can be synchronized, and there is no limit to a distance between the terminals. However, the existing solution is simply synchronization from one terminal to another. For example, a user has a plurality of mobile phones, and the plurality of mobile phones have all logged in to a same account. Through cloud synchronization, a call record on one mobile phone can be synchronized to another mobile phone. Call records on different mobile phones exist separately. The user cannot identify call answering or making statuses on the plurality of terminals by using one of the call records, and needs to query a plurality of call records. User experience is poor.

SUMMARY

Embodiments of the present invention provide a call record synchronization method, a cloud platform, and a terminal. A user can use a merged call record to identify call answering or making statuses on a plurality of terminals, without querying a plurality of call records. This improves user experience.

According to a first aspect, a call record synchronization method is provided. A first terminal detects an input operation for requesting to display a call record; and after the first terminal detects the input operation, the first terminal displays a merged call record, where the merged call record is a call record obtained after merging of a call record of the first terminal and a call record of a second terminal, and the merged call record includes a device identifier of the first terminal and/or a device identifier of the second terminal.

In this embodiment of the present invention, the first terminal detects the input operation for requesting to display a call record, and after detecting the input operation, displays the merged call record. The merged call record is the call record obtained after merging of the call record of the first terminal and the call record of the second terminal, and the merged call record includes the device identifier of the first terminal and/or the device identifier of the second terminal. Therefore, by using the merged call record, a user can not only identify a call answering or making status on the first terminal, but also identify a call answering or making status on the second terminal, without querying a plurality of call records. This improves user experience.

In a possible implementation, before the first terminal displays the merged call record, the first terminal receives the call record of the second terminal from the second terminal, where the call record of the second terminal includes at least one piece of call log information of the second terminal; and the first terminal merges the call record of the first terminal and the call record of the second terminal, to obtain the merged call record. According to this implementation, the first terminal may receive the call record of the second terminal directly from the second terminal, and merge the call record of the first terminal and the call record of the second terminal, to obtain the merged call record. This manner is simple and easy to implement.

In a possible implementation, before the first terminal displays the merged call record, the first terminal receives the merged call record from a cloud platform, where the merged call record is a call record obtained after merging, by the cloud platform, of the call record of the first terminal and the call record of the second terminal.

In a possible implementation, before the first terminal displays the merged call record, the first terminal receives the call record of the second terminal from a cloud platform, where the call record of the second terminal includes at least one piece of call log information of the second terminal; and the first terminal merges the call record of the first terminal and the call record of the second terminal, to obtain the merged call record. According to this implementation, the first terminal does not receive the call record of the second terminal directly from the second terminal, but receive the call record of the second terminal from the cloud platform. This manner facilitates centralized management of call records of a large quantity of terminals for the cloud platform, and overcomes a problem that the first terminal and the second terminal cannot transmit a call record by using a Bluetooth communication connection when they are relatively far apart.

In a possible implementation, the first terminal and the second terminal have a same primary number.

In a possible implementation, the merged call record includes a call answering or making record of each of the first terminal and the second terminal.

In a possible implementation, the first terminal is a primary device, and the second terminal is a secondary device; the first terminal receives a call answering or making notification message from the second terminal; and the first terminal displays information in the call answering or making notification of the second terminal. According to this implementation, the primary device can learn that the secondary device has answered or made a call, and notify a user that a call has been answered or made on the secondary device, to alert the user and protect user privacy.

In a possible implementation, the first terminal is a secondary device, and the second terminal is a primary device; the first terminal sends a call answering or making notification message to the second terminal. According to this implementation, the secondary device can notify the primary device that the secondary device has answered or made a call, to alert the user and protect user privacy.

According to a second aspect, a call record synchronization method is provided. A cloud platform receives a call record of each terminal sent by a plurality of terminals, where the call record of each terminal includes at least one piece of call log information of each terminal; the cloud platform merges the call record of each terminal sent by the plurality of terminals, to obtain a merged call record, where the merged call record includes a device identifier of at least one of the plurality of terminals; and the cloud platform sends the merged call record to the at least one of the plurality of terminals.

In this embodiment of the present invention, the cloud platform receives the call record of each terminal sent by the plurality of terminals, merges the call record of each terminal sent by the plurality of terminals, and sends the merged call record to the at least one of the plurality of terminals. The merged call record includes the device identifier of the at least one of the plurality of terminals. Therefore, by using the merged call record, a user can not only identify a call answering or making status on one terminal, but also identify a call answering or making status on another terminal, without querying a plurality of call records. This improves user experience.

In a possible implementation, the cloud platform determines that the plurality of terminals have a same primary number; the cloud platform selects call record entries that belong to the same primary number, from the call record of each terminal sent by the plurality of terminals; and the cloud platform merges the call record entries of each terminal that belong to the same primary number, to obtain the merged call record. According to this implementation, for a plurality of terminals that have subscribed to a one-number-multi-card service, the plurality of terminals having the same primary number are determined first, and then the call record entries that belong to the same primary number are selected from the call record of each terminal sent by the plurality of terminals, to facilitate merging of the call record entries, preventing a waste of processing resources.

In a possible implementation, the merged call record includes a call answering or making record of each of the plurality of terminals.

In a possible implementation, the plurality of terminals include a primary device and a secondary device; the cloud platform receives a call answering or making notification request message from the secondary device; and the cloud platform sends a call answering or making notification message of the secondary device to the primary device. According to this implementation, the secondary device first notifies the cloud platform that the secondary device has answered or made a call, and then the cloud platform notifies the primary device that the secondary device has answered or made a call, to alert the user and protect user privacy.

According to a third aspect, a call record synchronization method is provided. A first terminal sends a call record of the first terminal to a cloud platform, where the call record of the first terminal includes at least one piece of call log information of the first terminal; and the first terminal receives a merged call record from the cloud platform, where the merged call record is a call record obtained after merging of the call record of the first terminal and a call record of a second terminal, and the merged call record includes a device identifier of the first terminal and/or a device identifier of the second terminal.

In this embodiment of the present invention, the merged call record includes the device identifier of the first terminal and/or the device identifier of the second terminal. Therefore, by using the merged call record, a user can not only identify a call answering or making status on one terminal, but also identify a call answering or making status on another terminal, without querying a plurality of call records. This improves user experience.

In a possible implementation, the first terminal and the second terminal have a same primary number.

In a possible implementation, the merged call record includes a call answering or making record of each of the first terminal and the second terminal.

In a possible implementation, the first terminal is a primary device, and the second terminal is a secondary device; the first terminal receives a call answering or making notification message of the second terminal from the cloud platform; and the first terminal displays information in the call answering or making notification of the second terminal.

According to this implementation, the primary device can learn, from the cloud platform, that the secondary device has answered or made a call, and notify a user that a call has been answered or made on the secondary device, to alert the user and protect user privacy.

In a possible implementation, the first terminal is a secondary device, and the second terminal is a primary device; the first terminal sends a call answering or making notification request message to the cloud platform. According to this implementation, the secondary device can notify the primary device that the secondary device has answered or made a call, to alert the user and protect user privacy.

According to still another aspect, an embodiment of the present invention provides a terminal. The terminal may implement functions implemented by the first terminal in the method embodiment of the first aspect, and the functions may be implemented by using hardware, or may be implemented by executing corresponding software by hardware. The hardware or software includes one or more modules corresponding to the foregoing functions.

In a possible design, a structure of the first terminal includes a processor and a display. The processor is configured to support the first terminal in implementing the corresponding functions in the foregoing method, and the display is configured to support the first terminal in displaying a merged call record. The first terminal may further include a memory. The memory is configured to be coupled with the processor, and the memory stores a program instruction and data that are necessary for the first terminal.

According to still another aspect, an embodiment of the present invention provides a cloud platform. The cloud platform may implement functions implemented by the cloud platform in the method example of the second aspect, and the functions may be implemented by using hardware, or may be implemented by executing corresponding software by hardware. The hardware or software includes one or more modules corresponding to the foregoing functions.

In a possible design, a structure of the cloud platform includes a processor and a communications module. The processor is configured to support the cloud platform in implementing the corresponding functions in the foregoing method, and the communications module is configured to support communication between the cloud platform and a terminal or another network element. The cloud platform may further include a memory. The memory is configured to be coupled with the processor, and the memory stores a program instruction and data that are necessary for the cloud platform.

According to still another aspect, an embodiment of the present invention provides a terminal. The terminal may implement functions implemented by the first terminal in the method embodiment of the third aspect, and the functions may be implemented by using hardware, or may be implemented by executing corresponding software by hardware. The hardware or software includes one or more modules corresponding to the foregoing functions.

In a possible design, a structure of the first terminal includes a processor and a communications module. The processor is configured to support the first terminal in implementing the corresponding functions in the foregoing method, and the communications module is configured to support communication between the first terminal and a second terminal or a cloud platform. The first terminal may further include a memory. The memory is configured to be coupled with the processor, and the memory stores a program instruction and data that are necessary for the first terminal.

According to still another aspect, an embodiment of the present invention provides a communications system. The system includes the terminal and the cloud platform described in the foregoing aspects.

According to yet another aspect, an embodiment of the present invention provides a computer storage medium, configured to store a computer software instruction used by the foregoing terminal. The computer software instruction includes a program designed for executing the first aspect.

According to yet another aspect, an embodiment of the present invention provides a computer storage medium, configured to store a computer software instruction used by the foregoing cloud platform. The computer software instruction includes a program designed for executing the second aspect.

According to yet another aspect, an embodiment of the present invention provides a computer storage medium, configured to store a computer software instruction used by the foregoing terminal. The computer software instruction includes a program designed for executing the third aspect.

DESCRIPTION OF EMBODIMENTS

To make the purpose, technical solutions, and advantages of the embodiments of the present invention clearer, the following describes the technical solutions of the embodiments of the present invention with reference to the accompanying drawings in the embodiments of the present invention.

An embodiment of the present invention provides a call record synchronization method. When a user has a plurality of terminals, a call record of each of the plurality of terminals may be synchronized to at least one of the plurality of terminals, and the at least one terminal displays a merged call record. The call record displays call answering or making records of the plurality of terminals and a device identifier of a terminal corresponding to each call record entry.

In one example, when the plurality of terminals perform call record synchronization, a communication connection may be established directly between the plurality of terminals, so that a call record of one terminal is sent to another terminal. For example, the user has two terminals, a mobile phone and a watch. When the mobile phone and the watch are relatively close, the watch may send a call record of the watch to the mobile phone by using a Bluetooth communication connection between the watch and the mobile phone. The Bluetooth communication connection is merely an example. In this embodiment of the present invention, the plurality of terminals may perform call record synchronization in another short-range communication manner.

In another example, when the plurality of terminals perform call record synchronization, a call record of one terminal may be sent to another terminal by forwarding by a third-party server. The third-party server may be but is not limited to a cloud platform. For example, if the plurality of terminals of the user are all connected to the cloud platform and have logged in to a same cloud account, each terminal may upload its own call record to the cloud platform, or may download a call record of another terminal from the cloud platform. To improve user experience, in this embodiment of the present invention, the cloud platform merges the call records of the plurality of terminals, and then sends the merged call record to each terminal, so that the user can query the merged call record on one terminal to know call statuses of the plurality of terminals owned by the user. This improves user experience. For example, the third-party server may alternatively be an instant communication software server such as a WeChat server or a QQ server. To improve user experience, in this embodiment of the present invention, the instant communication software server may also merge the call records of the plurality of terminals, and then sends the merged call record to each terminal, so that the user can query the merged call record on one terminal to know the call statuses of the plurality of terminals owned by the user. This improves user experience.

Figure 1:
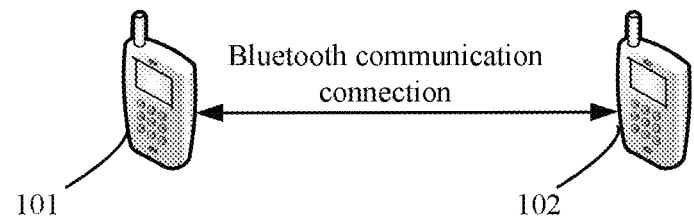
FIG. 1 is a schematic diagram of an application scenario to which a solution provided in an embodiment of the present invention may be applied.

FIG. 1 is a schematic diagram of an application scenario to which the solution provided in this embodiment of the present invention may be applied. This scenario includes a terminal 101 and a terminal 102. The terminal 101 and the terminal 102 have subscribed to a one-number-multi-card service or a one-number-multi-terminal service, so it is determined that the terminal 101 and the terminal 102 are two terminals of a same user. When the terminal 101 and the terminal 102 are relatively close and a Bluetooth communication connection is established between them, call record synchronization may be performed. For example, a call record of the terminal 101 is sent to the terminal 102, and/or a call record of the terminal 102 is sent to the terminal 101. The terminal 101 and/or the terminal 102 merge/merges call records of the plurality of terminals belonging to the same user, that is, combine/combines a plurality of call records of the plurality of terminals into a merged call record, where the merged call record includes device identifiers of the terminals; and then display/displays the merged call record. In this way, it is convenient for the user to view call statuses of the plurality of terminals on one terminal, and user experience is improved. FIG. 1 shows only a case in which both the terminal 101 and the terminal 102 are mobile phones. Actually, device types of the terminal 101 and the terminal 102 may be the same or different. This is not limited in this embodiment of the present invention. For example, the terminal 101 is a mobile phone, and the terminal 102 is a watch.

Figure 2:
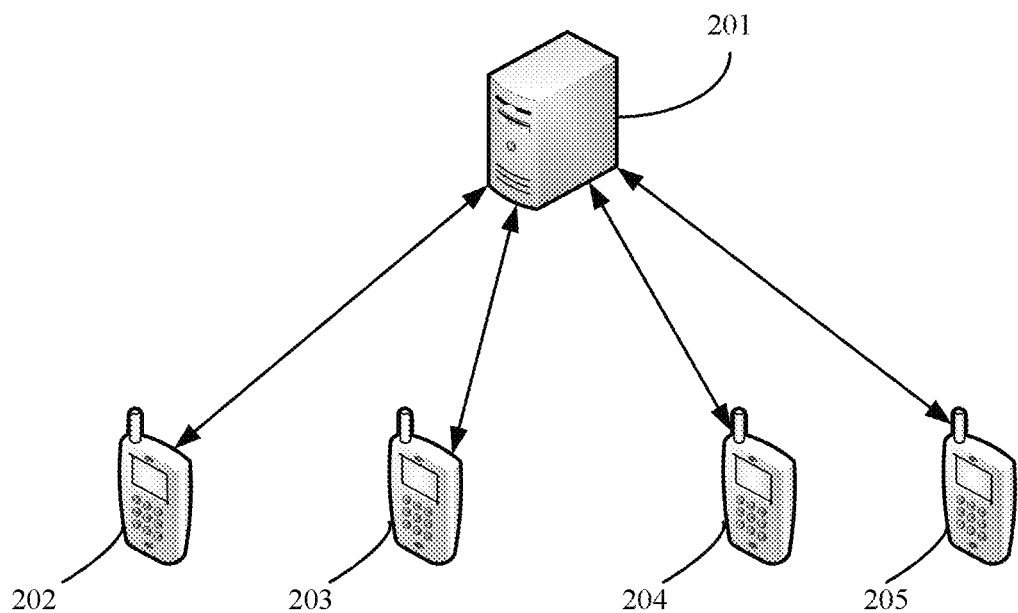
FIG. 2 is a schematic diagram of another application scenario to which a solution provided in an embodiment of the present invention may be applied.

FIG. 2 is a schematic diagram of another application scenario to which the solution provided in this embodiment of the present invention may be applied. This scenario includes a cloud platform 201, a terminal 202, a terminal 203, a terminal 204, and a terminal 205. The cloud platform 201 includes a cloud server. The cloud server may also be referred to as a cloud host, which includes a plurality of parts, similar to independent hosts, divided on a group of cluster servers, and each server in a cluster has an image of the cloud host. When a hardware fault occurs on one of the machines, a system automatically accesses an image backup on another machine, improving stability and security of the cloud host. It should be noted that the plurality of terminals of the user may be two or more terminals. This is not limited in this embodiment of the present invention. The plurality of terminals of the user may be of a same type, for example, may all be mobile phones, or may be of different types. For example, one is a mobile phone, another one is a tablet computer, and still another is a smartwatch.

In one example, the cloud platform 201 is configured to provide a cloud synchronization service for the plurality of terminals. The terminal 202 and the terminal 203 have logged in to a cloud account 1, and the terminal 204 and the terminal 205 have logged in to a cloud account 2. The terminal 202, the terminal 203, the terminal 204, and the terminal 205 may all upload their own call records to the cloud platform 201 after updating the call records. After receiving the call records of the plurality of terminals, the cloud platform 201 may determine, based on a cloud account logged in to by each terminal, that the terminal 202 and the terminal 203 have logged in to the same cloud account, namely, the cloud account 1, and therefore determine that the terminal 202 and the terminal 203 are two terminals of a same user; and similarly, may determine that the terminal 204 and the terminal 205 have logged in to the same cloud account, namely, the cloud account 2, and therefore determine that the terminal 204 and the terminal 205 are two terminals of a same user. Subsequently, the cloud platform 201 may send a call record of the terminal 203 to the terminal 202, and/or send a call record of the terminal 202 to the terminal 203, and the terminal 202 and/or the terminal 203 merge/merges and display/displays the call records of the plurality of terminals; and the cloud platform 201 may send a call record of the terminal 205 to the terminal 204, and/or send a call record of the terminal 204 to the terminal 205, and the terminal 204 and/or the terminal 205 merge/merges and display/displays the call records of the plurality of terminals. Optionally, the cloud platform 201 may not directly send a call record of one terminal to another terminal, but instead first merge call records of a plurality of terminals belonging to a same user, that is, combine the plurality of call records of the plurality of terminals into a merged call record, where the merged call record includes device identifiers of the terminals; and then send the merged call record to at least one terminal of the user. In this way, it is convenient for the user to view call statuses of the plurality of terminals on one terminal, and user experience is improved.

In this embodiment of the present invention, when the instant communication software server is used to implement call record synchronization among a plurality of terminals of a same user, and for example, the instant communication software server is the WeChat server, the WeChat server may determine a plurality of terminals that have logged in to a same WeChat account as a plurality of terminals of a same user. A call record synchronization method performed by the instant communication software server is similar to the call record synchronization method performed by the cloud platform, and details are not repeated herein again.

First, the call record synchronization method provided in this embodiment of the present invention is described by using the application scenario shown in FIG. 1 as an example.

With reference to the application scenario shown in FIG. 1, when a user has a plurality of terminals and the plurality of terminals have subscribed to the one-number-multi-card service, if one of the terminals updates a call record, the terminal may synchronize the call record among the plurality of terminals through Bluetooth synchronization.

The plurality of terminals of the user may be a plurality of terminals that have subscribed to the one-number-multi-card service or the one-number-multi-terminal service, but this embodiment of the present invention is not limited thereto. For example, the user has a plurality of mobile phones, and the plurality of mobile phones have not subscribed to the one-number-multi-card service or the one-number-multi-terminal service. In this case, call record synchronization among the plurality of terminals may be implemented according to an instruction of the user by using application programs installed on the mobile phones.

Figure 3:
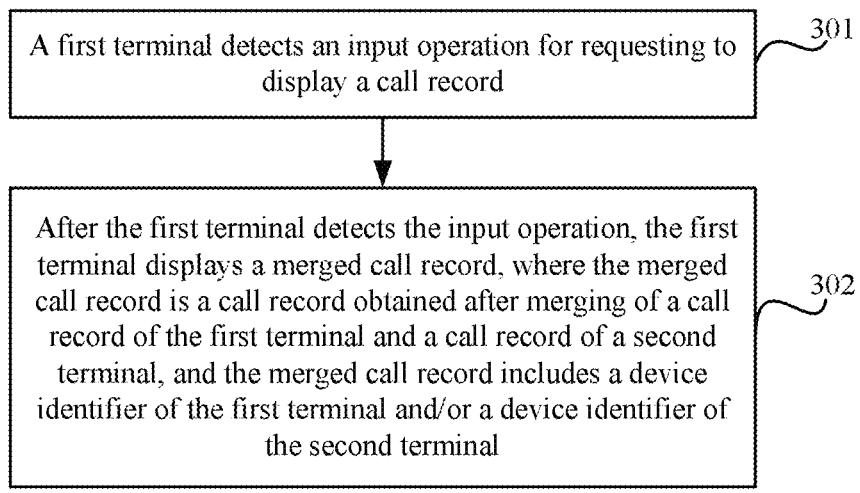
FIG. 3 is a signal flowchart of a call record synchronization method according to an embodiment of the present invention.

FIG. 3 is a signal flowchart of a call record synchronization method according to an embodiment of the present invention. The figure shows only two terminals, and actually may include more terminals. In this embodiment of the present invention, an example of merging call records of only two terminals is used for description. The method includes the following steps.

Step 301. A first terminal detects an input operation for requesting to display a call record.

In one example, the first terminal may detect whether a user has tapped a preset area on a touchscreen, to determine that the user requests to display a call record.

Optionally, the first terminal and a second terminal have a same primary number.

Step 302. After the first terminal detects the input operation, the first terminal displays a merged call record, where the merged call record is a call record obtained after merging of a call record of the first terminal and a call record of a second terminal, and the merged call record includes a device identifier of the first terminal and/or a device identifier of the second terminal.

Optionally, the merged call record includes a call answering or making record of each of the first terminal and the second terminal.

In one example, the merged call record may be displayed in a two-level manner. To be specific, some information of the call record is first displayed. For example, in a call record entry, only an incoming or outgoing number identifier and time information are displayed. When the user taps an area in which the call record entry is located on the touchscreen or an extended display identifier, all information of the call record entry is displayed. The all information includes the device identifier of the first terminal and/or the device identifier of the second terminal, and may also include information such as a home location.

In this embodiment of the present invention, the first terminal detects the input operation for requesting to display a call record, and after detecting the input operation, displays the merged call record. The merged call record is the call record obtained after merging of the call record of the first terminal and the call record of the second terminal, and the merged call record includes the device identifier of the first terminal and/or the device identifier of the second terminal. Therefore, by using the merged call record, the user can not only identify a call answering or making status on the first terminal, but also identify a call answering or making status on the second terminal, without querying a plurality of call records. This improves user experience.

Figure 4:
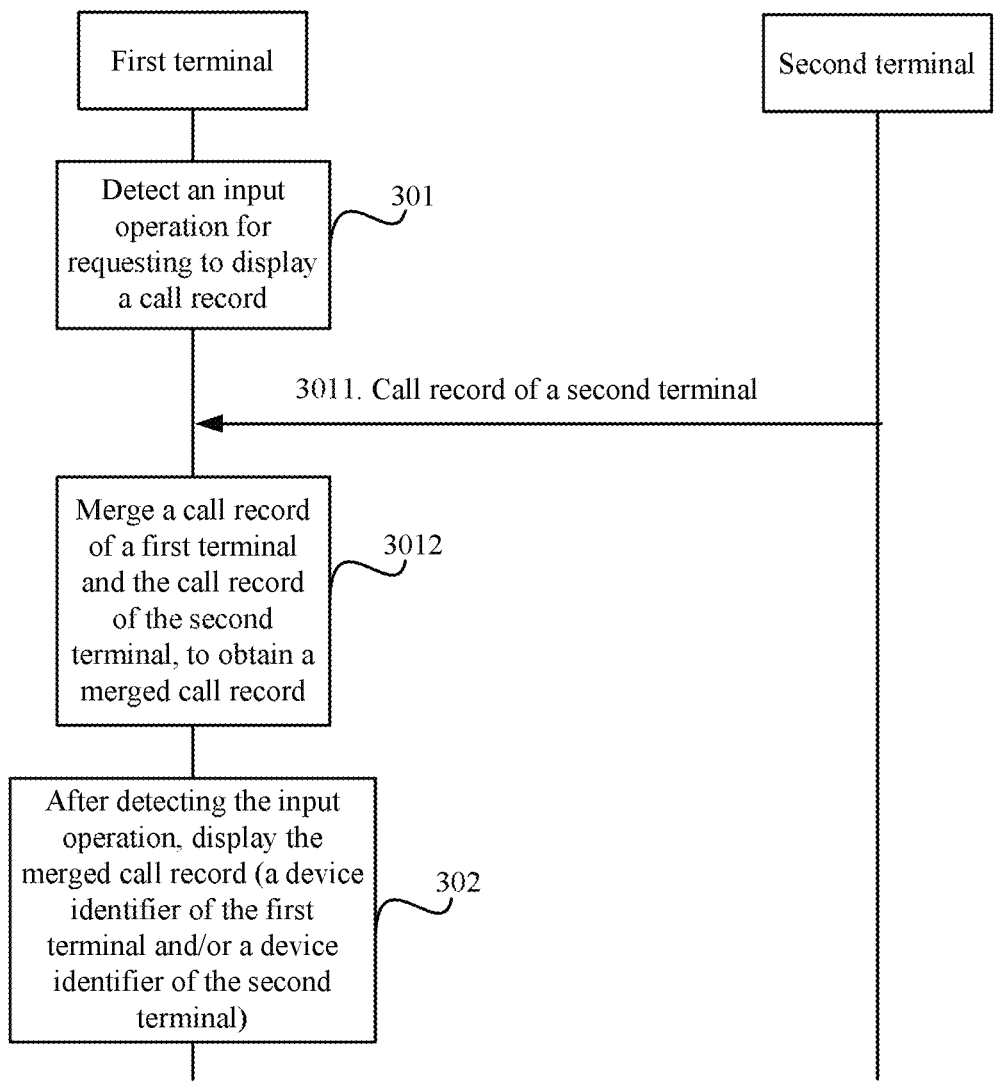
FIG. 4 is a signal flowchart of another call record synchronization method according to an embodiment of the present invention.

FIG. 4 is a signal flowchart of another call record synchronization method according to an embodiment of the present invention. Based on step 301 and step 302, before step 302, the method further includes the following steps.

Step 3011. The first terminal receives the call record of the second terminal from the second terminal, where the call record of the second terminal includes at least one piece of call log information of the second terminal.

In one example, the call record of the second terminal is actually a call record list including a plurality of pieces of call log information. During call record synchronization, the second terminal may send the entire call record list to the first terminal, or may send only newly-generated call log information to the first terminal.

Step 3012. The first terminal merges the call record of the first terminal and the call record of the second terminal, to obtain the merged call record.

Merging may be but is not limited to combining the call records of the two terminals, and the merged call record includes the device identifier of the first terminal and/or the device identifier of the second terminal.

According to this implementation, the first terminal may receive the call record of the second terminal directly from the second terminal, and merge the call record of the first terminal and the call record of the second terminal, to obtain the merged call record. This manner is simple and easy to implement.

Figure 5:
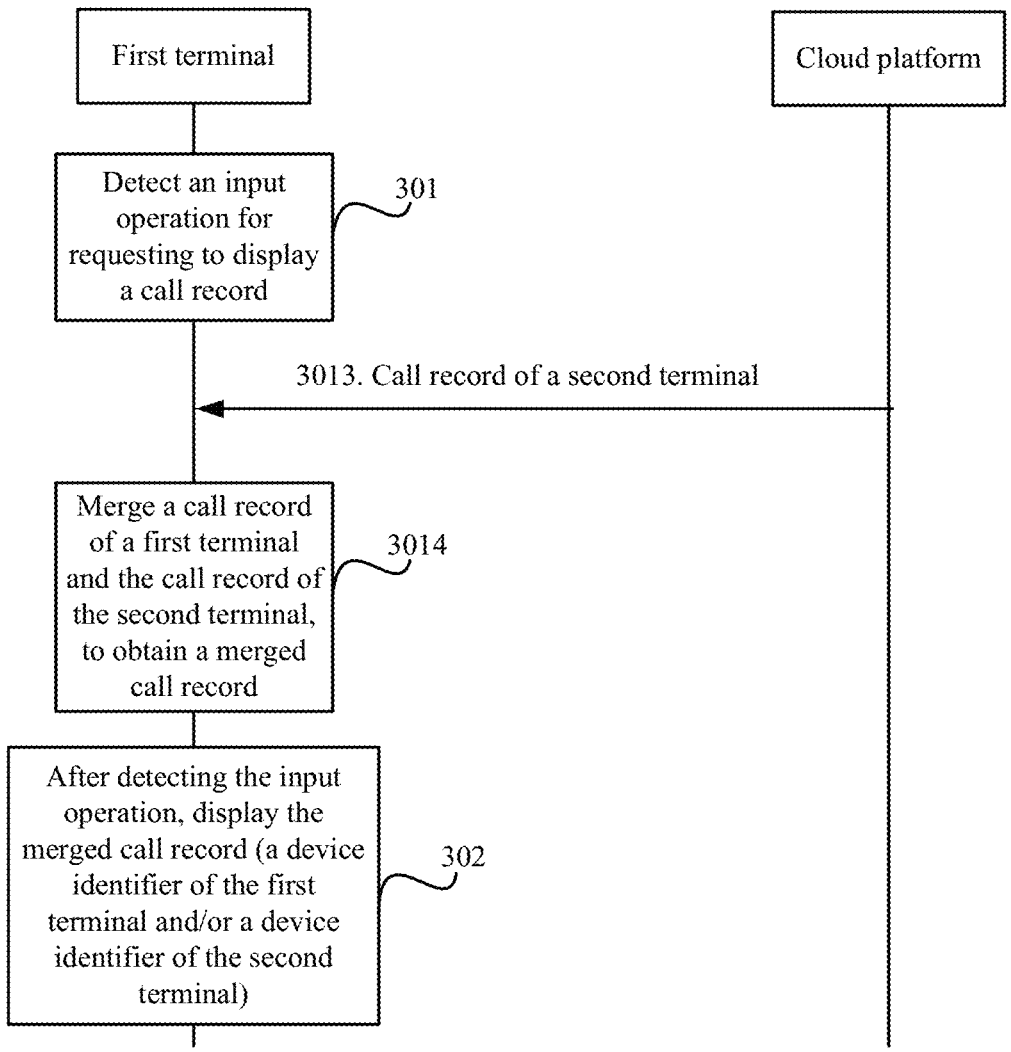
FIG. 5 is a signal flowchart of still another call record synchronization method according to an embodiment of the present invention.

FIG. 5 is a signal flowchart of still another call record synchronization method according to an embodiment of the present invention. This method may be based on the application scenario shown in FIG. 2. Based on step 301 and step 302, before step 302, the method further includes the following steps.

Step 3013. The first terminal receives the call record of the second terminal from a cloud platform, where the call record of the second terminal includes at least one piece of call log information of the second terminal.

In one example, when the first terminal and the second terminal are relatively far apart, the second terminal may first send the call record of the second terminal to the cloud platform. Then, the cloud platform sends the call record of the second terminal to the first terminal proactively or according to a download request of the first terminal.

Step 3014. The first terminal merges the call record of the first terminal and the call record of the second terminal, to obtain the merged call record.

Merging may be but is not limited to combining the call records of the two terminals, and the merged call record includes the device identifier of the first terminal and/or the device identifier of the second terminal.

According to this implementation, the first terminal does not receive the call record of the second terminal directly from the second terminal, but receive the call record of the second terminal from the cloud platform. This manner facilitates centralized management of call records of a large quantity of terminals for the cloud platform, and overcomes a problem that the first terminal and the second terminal cannot transmit a call record by using a Bluetooth communication connection when they are relatively far apart.

Figure 6:
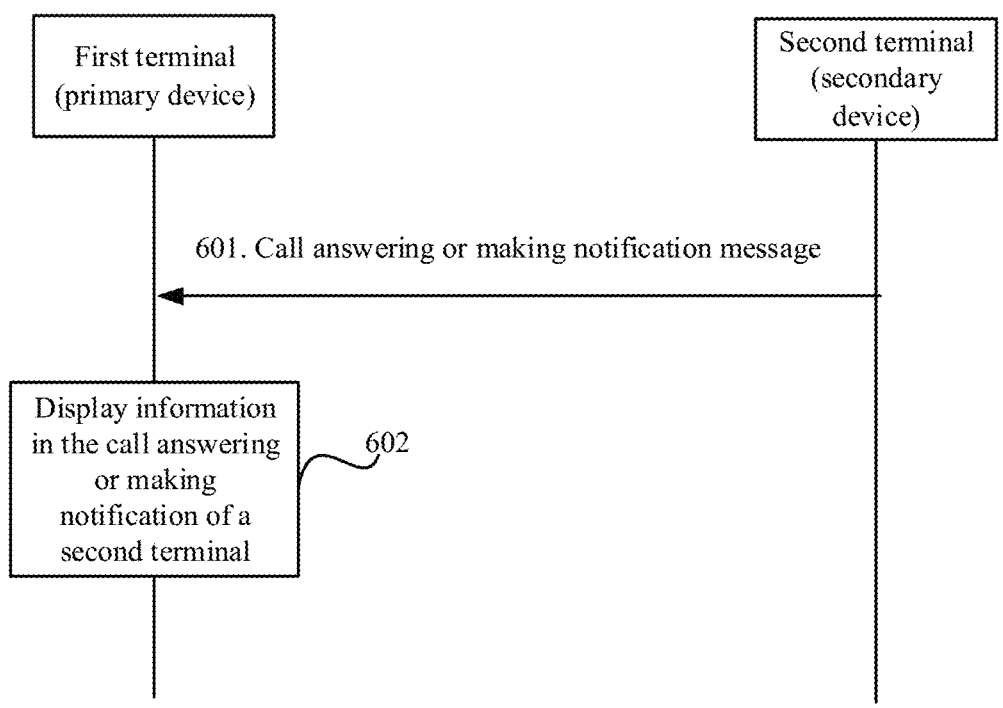
FIG. 6 is a signal flowchart of an alerting method according to an embodiment of the present invention.

FIG. 6 is a signal flowchart of an alerting method according to an embodiment of the present invention. A first terminal is a primary device, and a second terminal is a secondary device. The method includes the following steps.

Step 601. The first terminal receives a call answering or making notification message from the second terminal.

Obviously, if the first terminal is the secondary device, and the second terminal is the primary device, the first terminal sends a call answering or making notification message to the second terminal.

Step 602. The first terminal displays information in the call answering or making notification of the second terminal.

According to this implementation, the primary device can learn that the secondary device has answered or made a call, and notify a user that a call has been answered or made on the secondary device, to alert the user and protect user privacy.

It should be noted that the alerting method shown in FIG. 6 may be combined with the foregoing call record synchronization methods. For example, when the first terminal receives the call record of the second terminal from the second terminal, it can be considered that the first terminal receives the call answering or making notification message from the second terminal. The alerting method shown in FIG. 6 may also be implemented separately.

The following describes the call record synchronization method provided in this embodiment of the present invention by using the application scenario shown in FIG. 2 as an example.

With reference to the application scenario shown in FIG. 2, when the user has a plurality of terminals and the plurality of terminals have subscribed to the one-number-multi-card service, if one of the terminals updates a call record, the terminal may first determine whether a Bluetooth communication connection to another terminal is established. If it is determined that a Bluetooth communication connection to another terminal is established, the call record may be synchronized among the plurality of terminals in a Bluetooth synchronization manner. If it is determined that a Bluetooth communication connection to another terminal is not established, the call record may be synchronized among the plurality of terminals in a cloud synchronization manner.

The plurality of terminals of the user may be a plurality of terminals that have subscribed to the one-number-multi-card service or the one-number-multi-terminal service, but this embodiment of the present invention is not limited thereto. For example, the user has a plurality of mobile phones, and the plurality of mobile phones have not subscribed to the one-number-multi-card service or the one-number-multi-terminal service. In this case, the cloud platform may also merge call records of the plurality of mobile phones, to improve user experience.

A person skilled in the art may understand that the application scenarios shown in FIG. 1 and FIG. 2 are merely examples of an application scenario of this embodiment of the present invention, but not a limitation to the application scenario of this embodiment of the present invention.

Figure 7:
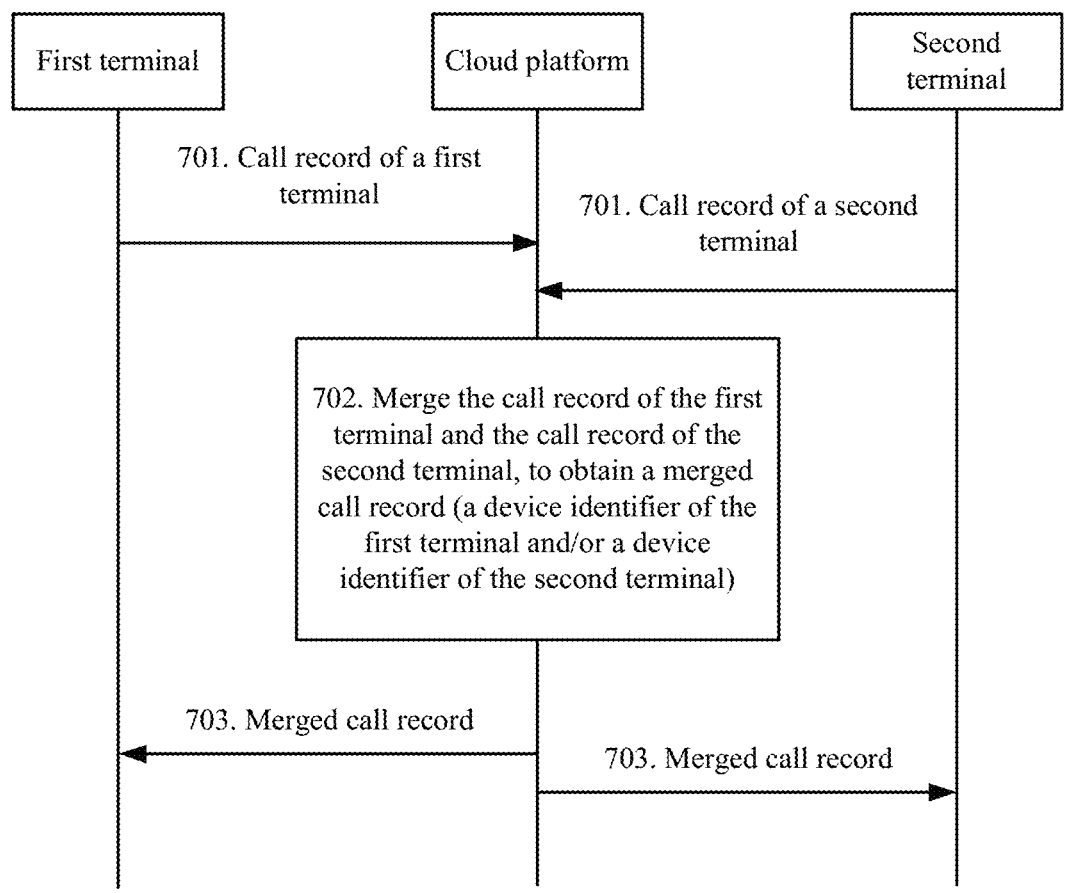
FIG. 7 is a signal flowchart of still another call record synchronization method according to an embodiment of the present invention.

FIG. 7 is a signal flowchart of still another call record synchronization method according to an embodiment of the present invention. The figure shows only two terminals, and actually may include more terminals. In this embodiment of the present invention, an example of merging call records of only two terminals is used for description. The method includes the following steps.

Step 701. A first terminal and/or a second terminal send/sends a call record of each terminal to a cloud platform, where the call record of each terminal includes at least one piece of call log information of each terminal.

In one example, both the first terminal and the second terminal have logged in to a cloud account, and subscribed to a one-number-multi-card service. When the first terminal and the second terminal ring simultaneously or successively, if a user answers the call by using the first terminal instead of the second terminal, the second terminal displays prompt information of the missed call, and generates a call record entry. At this time, the second terminal may immediately send its call record to the cloud platform, and the first terminal needs to wait for the call to end to generate a call record entry, and synchronize a call record to the cloud platform. The first terminal may be a mobile phone, and the second terminal may be a watch. A terminal may send its call record to the cloud platform periodically or after an update of the call record. For example, the first terminal and the second terminal are marked as a terminal 1 and a terminal 2, respectively. A sending interval of a call record may be preset. Each time after the sending interval elapses, the terminal 1 and the terminal 2 send their own call records to the cloud platform, and the cloud platform stores the call records. For another example, a terminal sends its call record to the cloud platform after being powered on, and sends its call record to the cloud platform again after the call record is updated. The update of the call record may include the following: A terminal receives a call but does not answer the call, a terminal receives a call and answers the call, or a terminal makes a call.

Optionally, the cloud platform may determine that the first terminal and the second terminal are using the same cloud account or have used the same cloud account, to determine that the plurality of terminals belong to the same user, so that the cloud platform merges call records of the plurality of terminals of the same user. In practice, the cloud platform may store a correspondence between a terminal and a cloud account. Even if the first terminal and/or the second terminal have/has not logged in to the cloud account, the stored correspondence may be used to determine that the first terminal and the second terminal belong to the same user.

Step 702. The cloud platform merges a call record of the first terminal and a call record of the second terminal, to obtain a merged call record, where the call record includes a device identifier of the first terminal and/or a device identifier of the second terminal.

In one example, a manner of merging, by the cloud platform, the call record of each terminal sent by the plurality of terminals may be combining the call records of the plurality of terminals. For example, referring to a schematic diagram, shown in FIG. 8, of merging call records of a plurality of terminals, incoming call record entries and outgoing call record entries in the call record of each terminal are separately processed. Both the incoming call record entries and the outgoing call record entries may be referred to as call log information. If a call record entry is an incoming call record entry, call record entries, on the plurality of terminals, in which incoming call numbers and times are the same as those of the call record entry are combined into one call record entry, and the combined call record entry includes an answering status on each terminal. If a call record entry is an outgoing call record entry, an outgoing device identifier is added to the outgoing call record entry, and then the call record entry is used as a merged call record entry. For example, combination of incoming call record entries of the plurality of terminals may be shown in Table 1.

TABLE 1

|  | Incoming call number | Incoming time | Answering status |
| --- | --- | --- | --- |
| Call record entry of a device 1 | 10086 | 13 hours (h) and 20 minutes (min) | Answered |
| Call record entry of a device 2 | 10086 | 13 hours and 20 minutes | Not answered |
| Combined call record entry | 10086 | 13 hours and 20 minutes | Answered on the device 1 Not answered on the device 2 |

Figure 9:
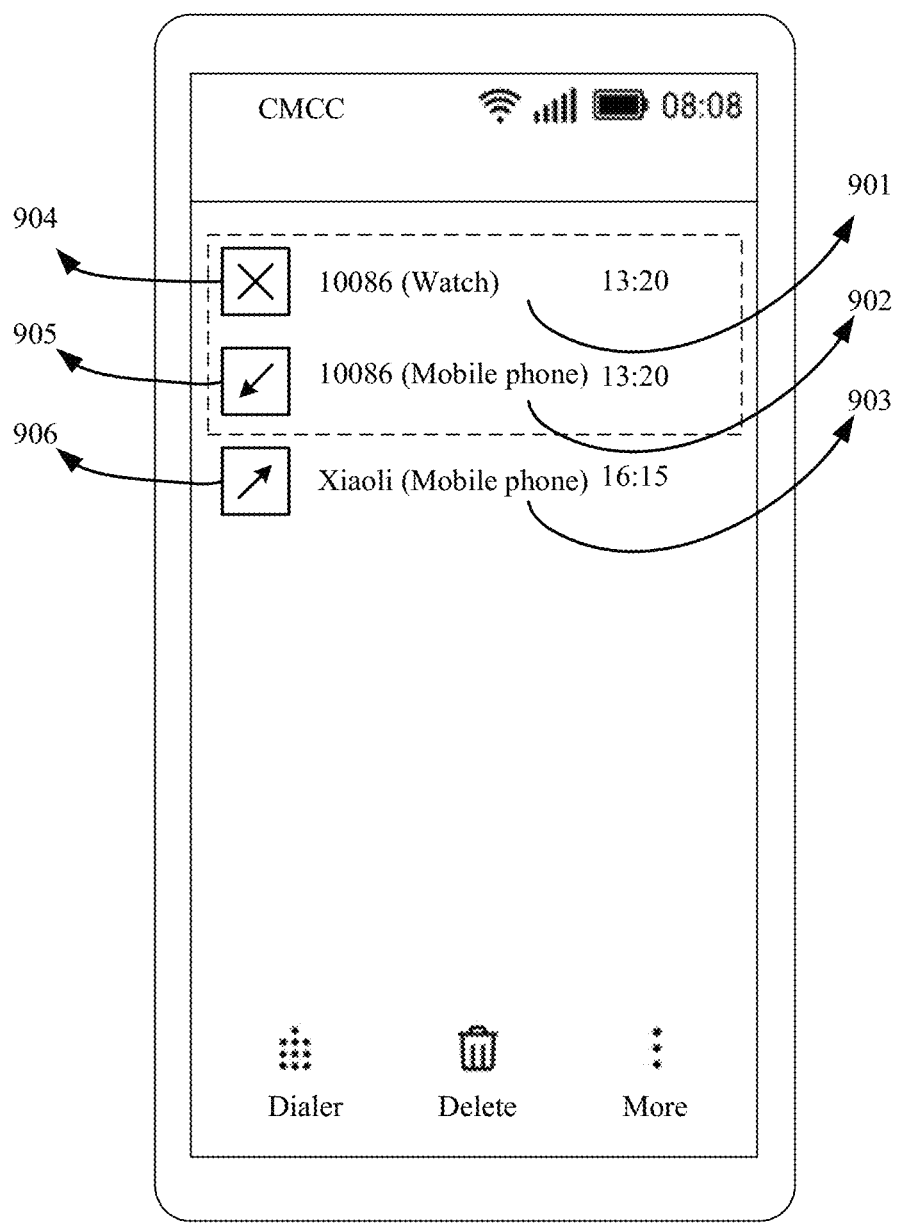
FIG. 9 is a schematic diagram of a display of a call record according to an embodiment of the present invention.

A device type of the device 1 is mobile phone, and a device type of the device 2 is watch. FIG. 9 is a schematic diagram of a display of a call record according to an embodiment of the present invention. As can be seen from FIG. 9, the combined incoming call record provides one call record entry for one incoming call, and the combined incoming call record entry records answering statuses on a plurality of terminals. In FIGS. 9, 901 and 902 represent device types of the terminals corresponding to the call record entry, and 904 and 905 represent the answering statuses on the terminals corresponding to the call record entry. 903 indicates that the call is not answered on a watch, and 904 indicates that the call has been answered on a mobile phone. Because the call record entry includes device identifiers of the terminals, a user can identify, based on the call record entry, a terminal on which the user answers the call. The process is simple and clear, and delivers good user experience.

Figure 8:
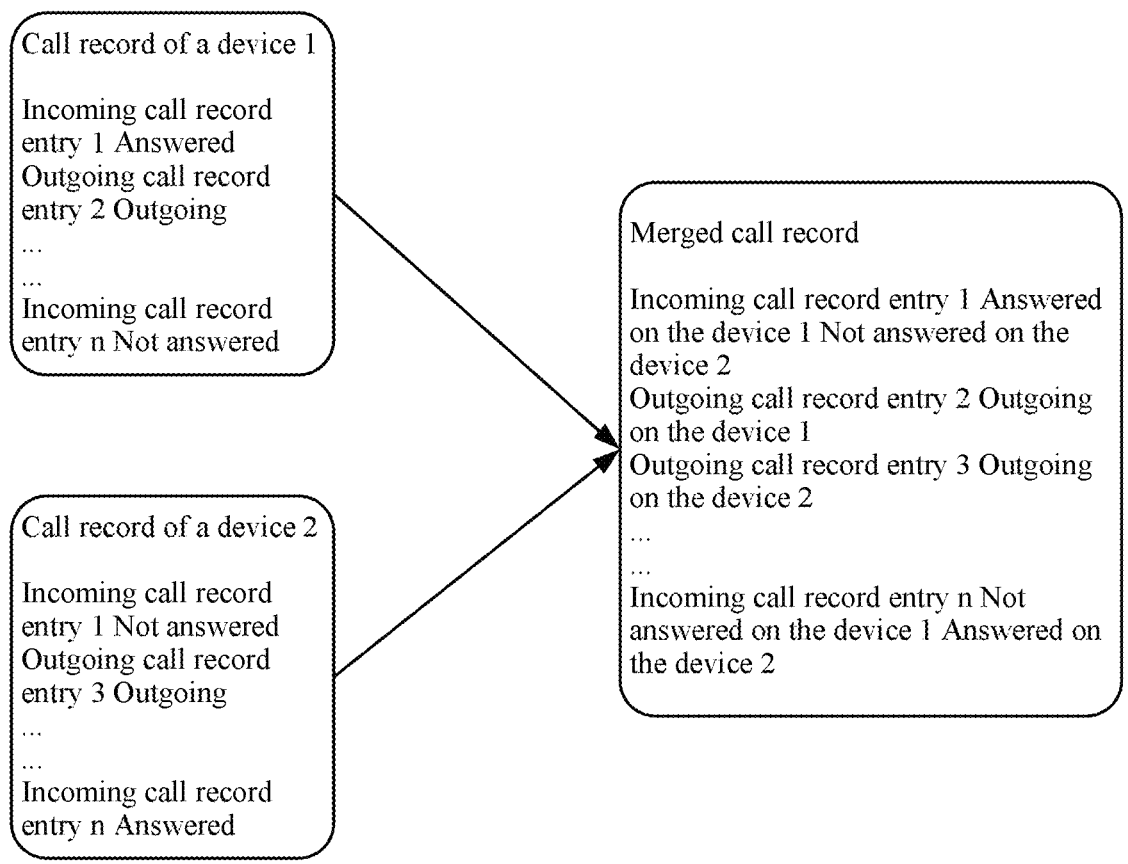
FIG. 8 is a schematic diagram of call record merging among a plurality of devices according to an embodiment of the present invention.

In addition, as can be seen from FIG. 8, an outgoing call record entry 2 indicates a call made by the device 1, and an outgoing call record entry 3 indicates a call made by the device 2. In other words, the merged call record includes both an outgoing call status of the device 1 and an outgoing call status of the device 2. The merged call record includes an outgoing call status of each of the plurality of terminals owned by the user. The merged call record is all-inclusive, keeping the user from querying the call record of each terminal one by one, and delivering good user experience. Referring to FIG. 9, 903 represents a device type of a terminal corresponding to a call record entry, and 906 indicates that the terminal corresponding to the call record entry made a call.

In another example, the cloud platform determines that the plurality of terminals have a same primary number. The cloud platform selects call record entries that belong to the same primary number, from the call record of each terminal sent by the plurality of terminals. For example, after the selection, a call record of the device 1 is listed in Table 2, and a call record of the device 2 is listed in Table 3. The cloud platform merges the call record entries of each terminal that belong to the same primary number, to obtain the merged call record. For example, a merged call record of a primary number A is listed in Table 4.

TABLE 2

| Primary number | Cloud account | Call record entry identifier | Type | Whether answered or not | Device identifier |
| --- | --- | --- | --- | --- | --- |
| Primary number A | Cloud account 1 | Call record entry 1 | Incoming | Yes | Device 1 |
| Primary number A | Cloud account 1 | Call record entry 2 | Outgoing |  | Device 1 |

As can be seen from Table 2, after the call record selection based on the primary number, the call record of the device 1 includes only call record entries of the primary number A.

TABLE 3

| Primary number | Cloud account | Call record entry identifier | Type | Whether answered or not | Device identifier |
| --- | --- | --- | --- | --- | --- |
| Primary number A | Cloud account 1 | Call record entry 1 | Incoming | No | Device 2 |
| Primary number A | Cloud account 1 | Call record entry 3 | Outgoing |  | Device 2 |

As can be seen from Table 3, after the call record selection based on the primary number, the call record of the device 2 includes only call record entries of the primary number A.

TABLE 4

| Call record entry identifier | Type | Answering device (whether answered or not) | Outgoing device |
| --- | --- | --- | --- |
| Call record entry 1 | Incoming | Device 1 (yes) |  |
| Call record entry 2 | Outgoing |  | Device 1 |
| Call record entry 1 | Incoming | Device 2 (no) |  |
| Call record entry 3 | Outgoing |  | Device 2 |

As can be seen from Table 4, the merged call record includes only the call records of the primary number A of the device 1 and the device 2.

In one example, the merged call record includes a call answering or making record of each of the plurality of terminals.

Step 703. The cloud platform sends the merged call record to the first terminal and/or the second terminal.

Figure 10:
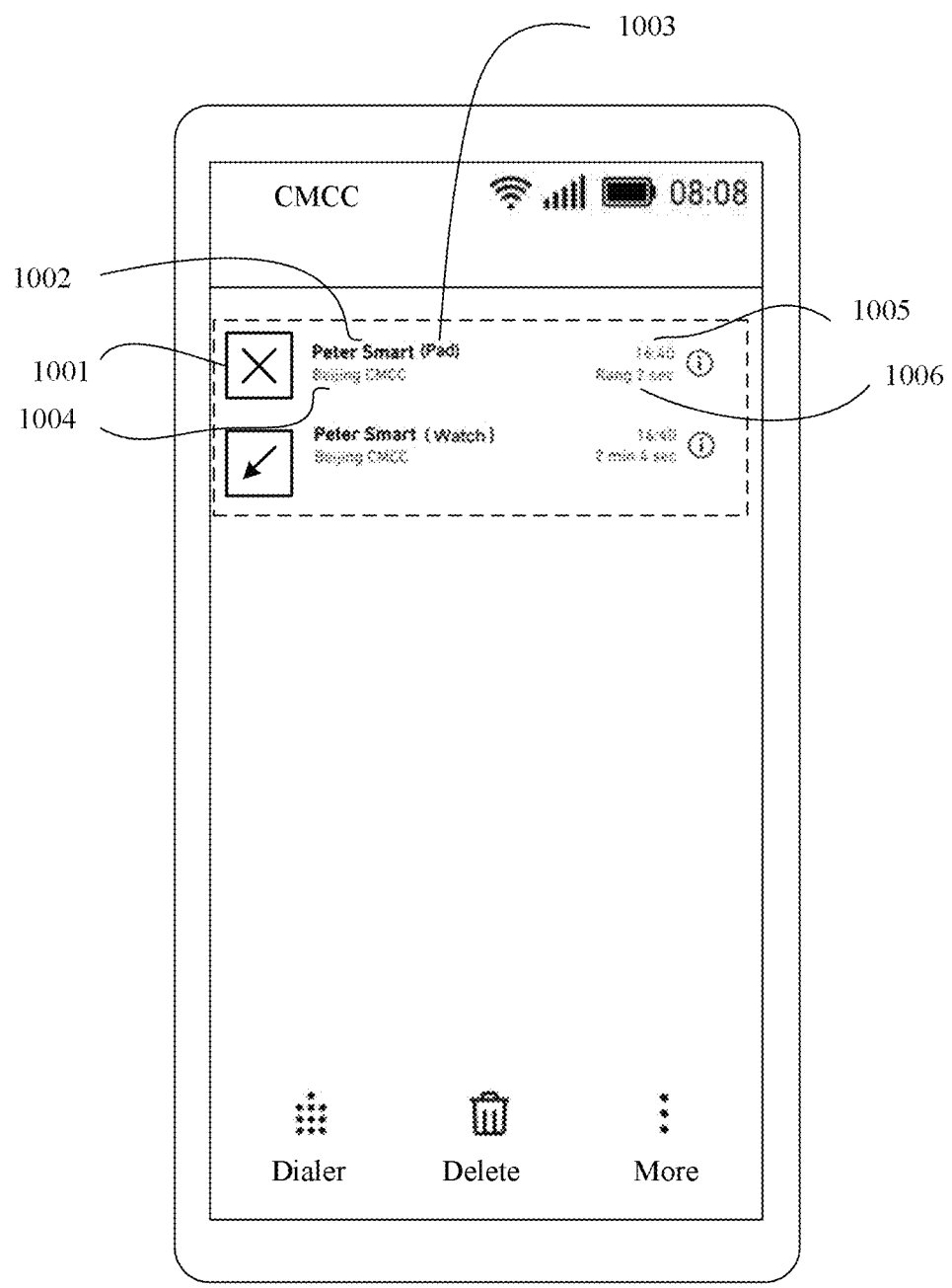
FIG. 10 is a schematic diagram of a user interface design of a merged call record on a mobile phone according to an embodiment of the present invention.

A terminal may display the merged call record. In one example, a user interface (User Interface, UI) design of a merged call record on a mobile phone is shown in FIG. 10. Referring to FIG. 10, call record entries may be vertically displayed on a display screen of the mobile phone. Each call record entry includes an incoming or outgoing call status identifier 1001, an incoming or outgoing call number identifier 1002, a device identifier 1003, a home location identifier 1004, a call record entry generation time identifier 1005, and a ringing duration identifier or call duration identifier 1006. A first call record entry is used as an example. "x" indicates that an incoming call is not answered, "Peter Smart" indicates an identity of a user of an incoming call number, "Pad" means that the device identifier indicates that a device corresponding to the call record entry is a tablet computer, "Beijing CMCC" means that the home location identifier indicates that a home location is Beijing, "16:40" means that the call record entry generation time identifier indicates that the call record entry is generated at 16:40, and "Rang 2 sec" means that the ringing duration identifier indicates that ringing duration is 2 seconds.

Figure 11:
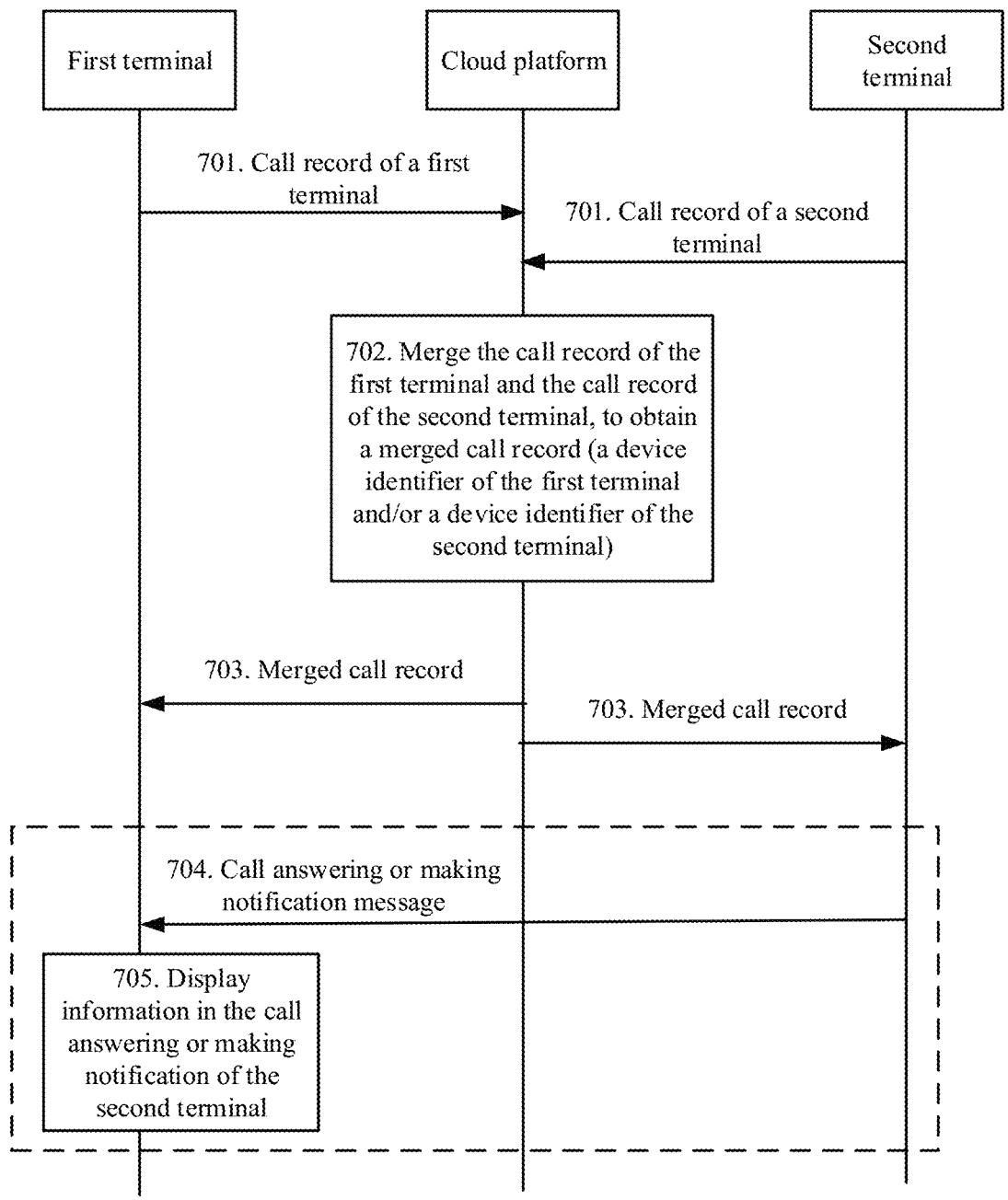
FIG. 11 is a signal flowchart of still another call record synchronization method according to an embodiment of the present invention.

FIG. 11 is a signal flowchart of still another call record synchronization method according to an embodiment of the present invention. Based on the embodiment shown in FIG. 7, a plurality of terminals are classified into a primary device and a secondary device. For example, among two terminals, one is the primary device, and the other one is the secondary device; or among at least three terminals, one is the primary device, and the others are secondary devices. In this embodiment of the present invention, only two terminals are used as an example for description. A first terminal is the primary device, and a second terminal is the secondary device. The method not only includes steps 701 to 703, but also includes the following steps.

Step 704. The second terminal sends a call answering or making notification message to the first terminal.

In one example, when answering or making a call, the second terminal sends the call answering or making notification message to the first terminal by using a Bluetooth communication connection.

In another example, when answering or making a call, the second terminal first determines whether a Bluetooth communication connection to the first terminal is established, and if determining that the Bluetooth communication connection to the first terminal is established, sends a call answering or making notification request message to the cloud platform. The request message may carry a device identifier of the second terminal and/or a device identifier of the first terminal. The cloud platform pushes the call answering or making notification message to the first terminal. The notification message may be but is not limited to an SMS message push notification. Optionally, the request message carries only the device identifier of the second terminal, and the cloud platform may query the first terminal based on a table, stored by the cloud platform, of a correspondence between the primary device and the secondary device, and then sends the call answering or making notification message of the second terminal to the first terminal. Alternatively, the request message not only carries the device identifier of the second terminal, but also carries the device identifier of the first terminal, and the cloud platform may send the call answering or making notification message of the second terminal to the first terminal based on the device identifier of the first terminal.

Step 705. The first terminal displays information in the call answering or making notification of the second terminal.

The first terminal, namely the primary device, may display the information in the call answering or making notification of the secondary device in a plurality of manners.

Figure 12:
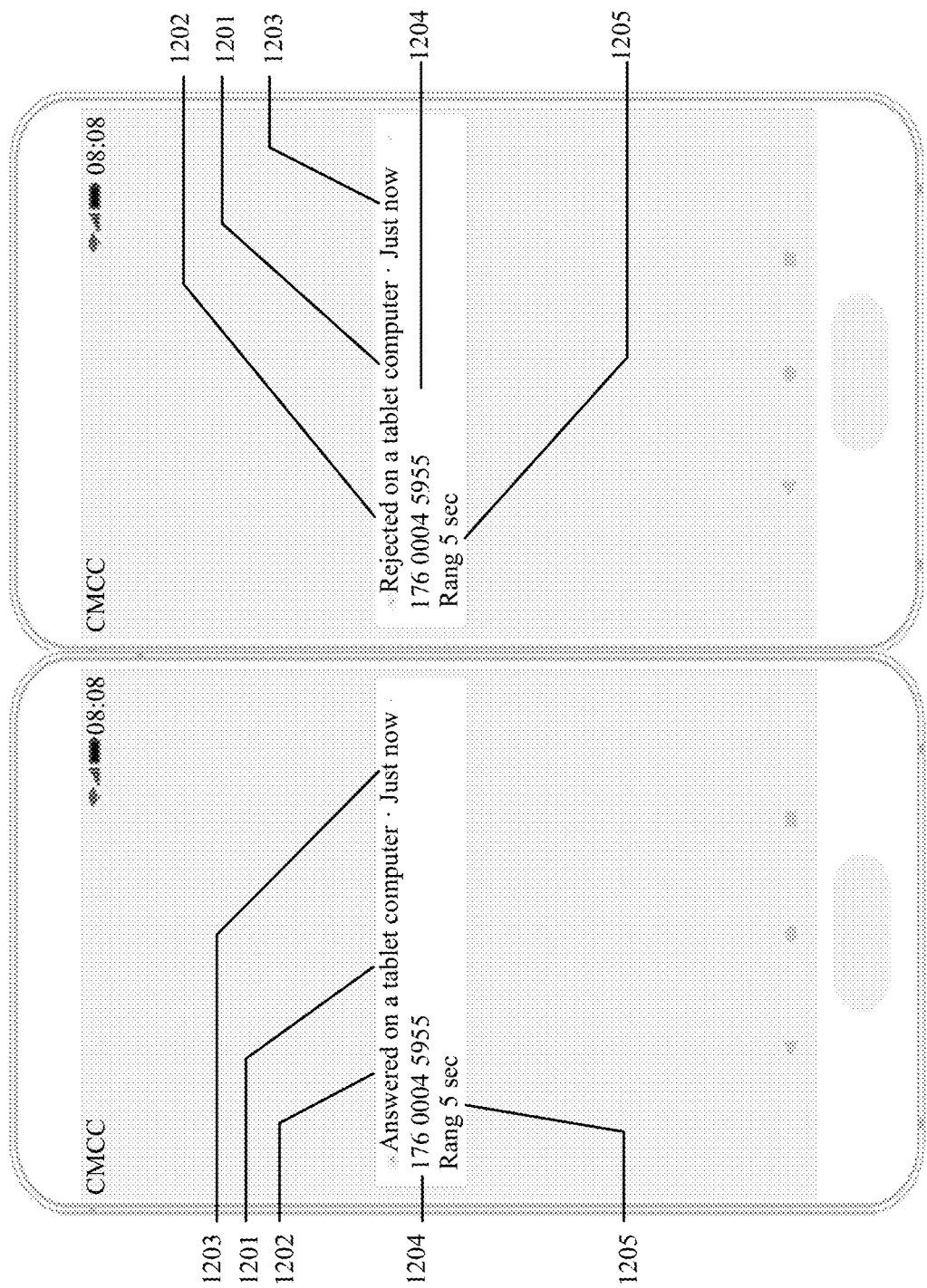
FIG. 12 is a schematic diagram of receiving, by a primary device in a lock screen state, a call answering notification of a secondary device according to an embodiment of the present invention.

FIG. 12 is a schematic diagram of receiving, by a primary device in a lock screen state, a call answering notification of a secondary device according to an embodiment of the present invention. Referring to FIG. 12, notification information displayed on the primary device may include a device identifier 1201 (for example, a tablet computer), an answering status 1202 (for example, answered or rejected), a time 1203 (for example, just now) when a call is answered, an incoming call number 1204 (for example, 17600045955), and ring duration 1205 (for example, rang 5 sec). It can be understood that the primary device may display the notification information on a display screen, or may play the notification information by using a speaker or an earpiece.

Figure 13:
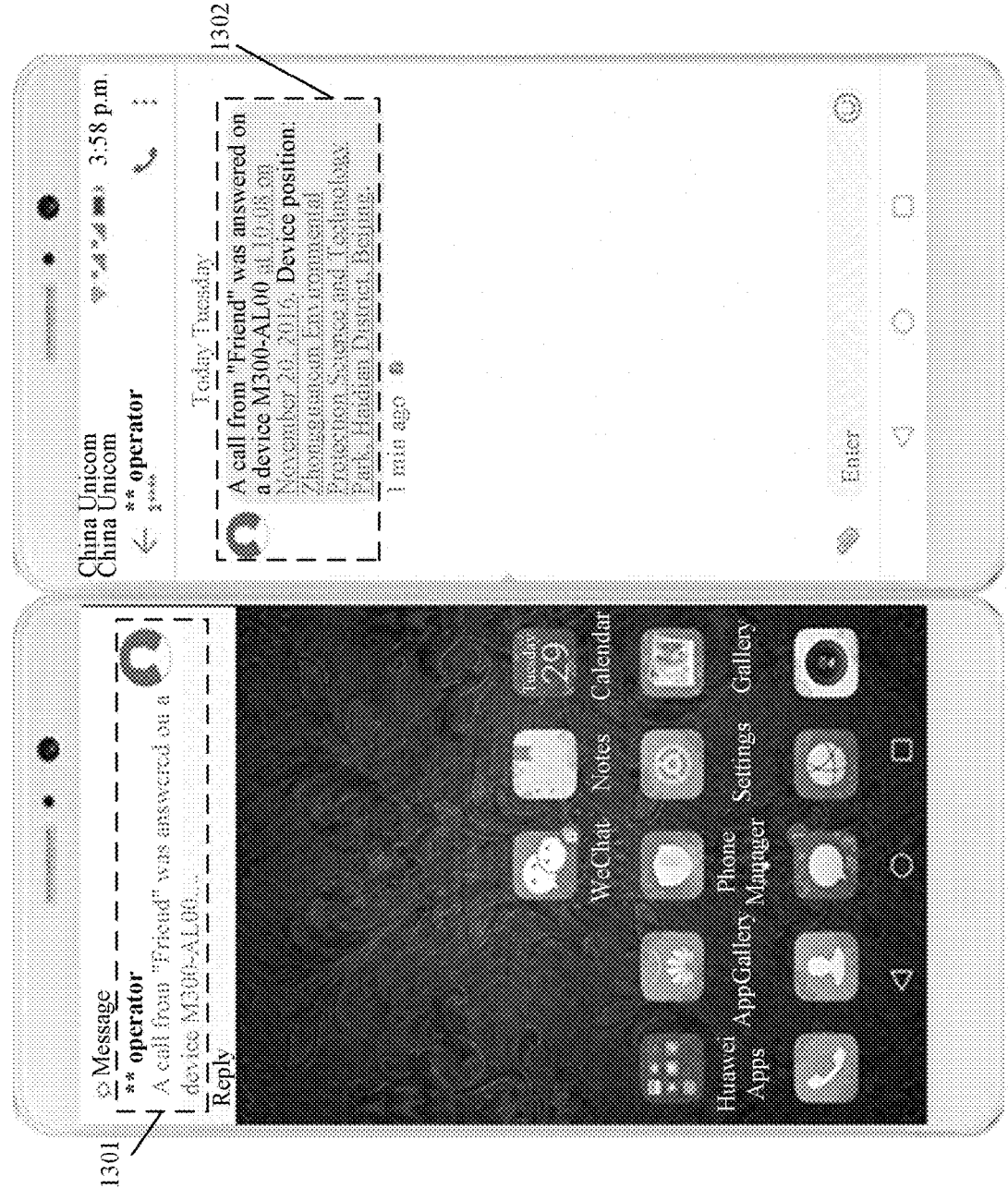
FIG. 13 is a schematic diagram of indicating, by a system notification bar and an SMS message on a primary device, reception of a call answering notification of a secondary device according to an embodiment of the present invention.

FIG. 13 is a schematic diagram of indicating, by a system notification bar and an SMS message on a primary device, reception of a call answering notification of a secondary device according to an embodiment of the present invention. Referring to FIG. 13, a left figure is a schematic diagram of indicating, by the system notification bar on the primary device, reception of the call answering notification of the secondary device, where a part indicated by 1301 is the call answering notification, displayed in the system notification bar, of the secondary device; and a right figure is a schematic diagram of indicating, by the SMS message on the primary device, reception of the call answering notification of the secondary device, where a part indicated by 1302 is the call answering notification, displayed in the SMS message, of the secondary device. In this embodiment of the present invention, a manner of displaying the notification information to a user by the primary device is not specifically limited.

It should be noted that a sequence for performing steps 701 to 703 and steps 704 and 705 is not limited. Steps 701 to 703 may be performed before steps 704 and 705 are performed, or steps 704 and 705 may be performed before steps 701 to 703 are performed, or steps 701 to 703 and steps 704 and 705 may be performed simultaneously. In addition, steps 704 and 705 may separately constitute a solution for preventing problems of theft of the secondary device and privacy leakage.

The foregoing mainly describes the solutions in the embodiments of the present invention from a perspective of interaction between the network elements. It can be understood that the network elements, such as the cloud platform and the terminal, include corresponding hardware structures and/or software modules for performing the functions, to implement the foregoing functions. A person skilled in the art should be easily aware that, in the present invention, units and algorithm steps in examples described with reference to the embodiments disclosed in this specification can be implemented by hardware or a combination of hardware and computer software. Whether a function is implemented by hardware or computer software driving hardware depends on particular applications and design constraints of the technical solutions. A person skilled in the art may use different methods to implement the described functions for each particular application, but it should not be considered that the implementation goes beyond the scope of the present invention.

In the embodiments of the present invention, the cloud platform, the terminal, and the like may be divided into function modules based on the foregoing method examples. For example, function modules corresponding to various functions may be obtained through division, or two or more functions may be integrated into one processing module. The integrated module may be implemented in a form of hardware, or may be implemented in a form of a software function module. It should be noted that the module division in the embodiments of the present invention is used as an example, is merely logical function division, and may be other division in actual implementation.

Figure 14:
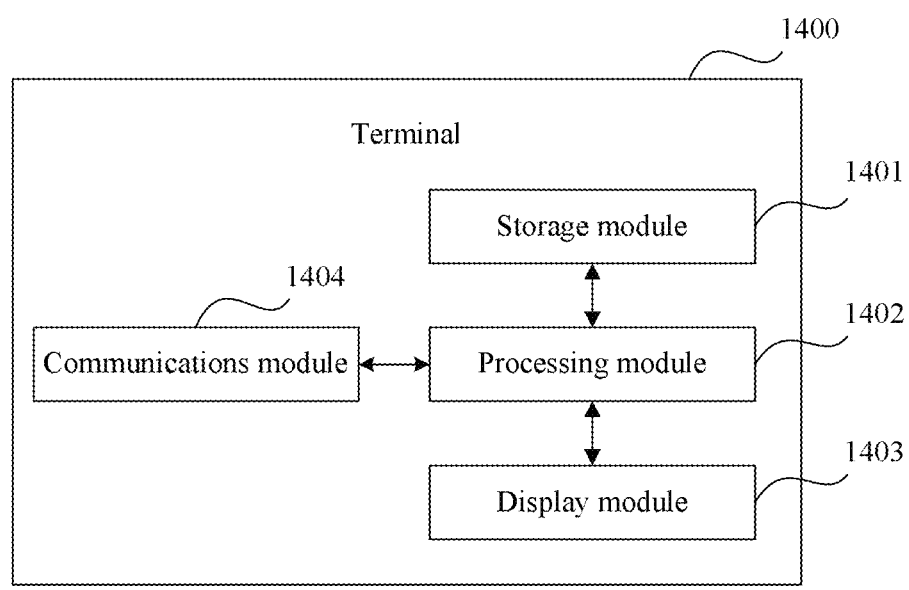
FIG. 14 is a possible schematic structural diagram of a terminal according to an embodiment of the present invention.

When the integrated module is used, FIG. 14 is a possible schematic structural diagram of the terminal in the foregoing embodiments. A terminal 1400 includes a processing module 1402 and a display module 1403. The processing module 1402 is configured to perform control management on actions of the terminal. For example, the processing module 1402 is configured to support the terminal in performing the processes 301 and 302 in FIG. 3, the processes 301, 3011, 3012, and 302 in FIG. 4, the processes 301, 3014, and 302 in FIG. 5, the processes 601 and 602 in FIG. 6, the process 701 in FIG. 7, the processes 701, 704, and 705 in FIG. 11, and/or another process of the technology described in this specification. The display module 1403 is configured to support the terminal in displaying information such as a call record entry or notification information. The terminal may further include a storage module 1401, configured to store program code and data of the terminal. The terminal may further include a communications module 1404, configured to support communication between the terminal and another network entity, for example, communication between the terminal and a cloud platform.

The processing module 1402 may be a processor or a controller, for example, may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 1402 may implement or execute various example logic blocks, modules, and circuits described with reference to content disclosed in the present invention. Alternatively, the processor may be a combination implementing a computing function, for example, a combination including one or more microprocessors, or a combination of the DSP and a microprocessor. The display module 1403 may be a display, or the like. The storage module 1401 may be a memory. The communications module 1404 may be a communications interface, a transceiver, a transceiver circuit, a radio frequency circuit, or the like. The communications interface is a collective term and may include one or more interfaces.

Figure 15:
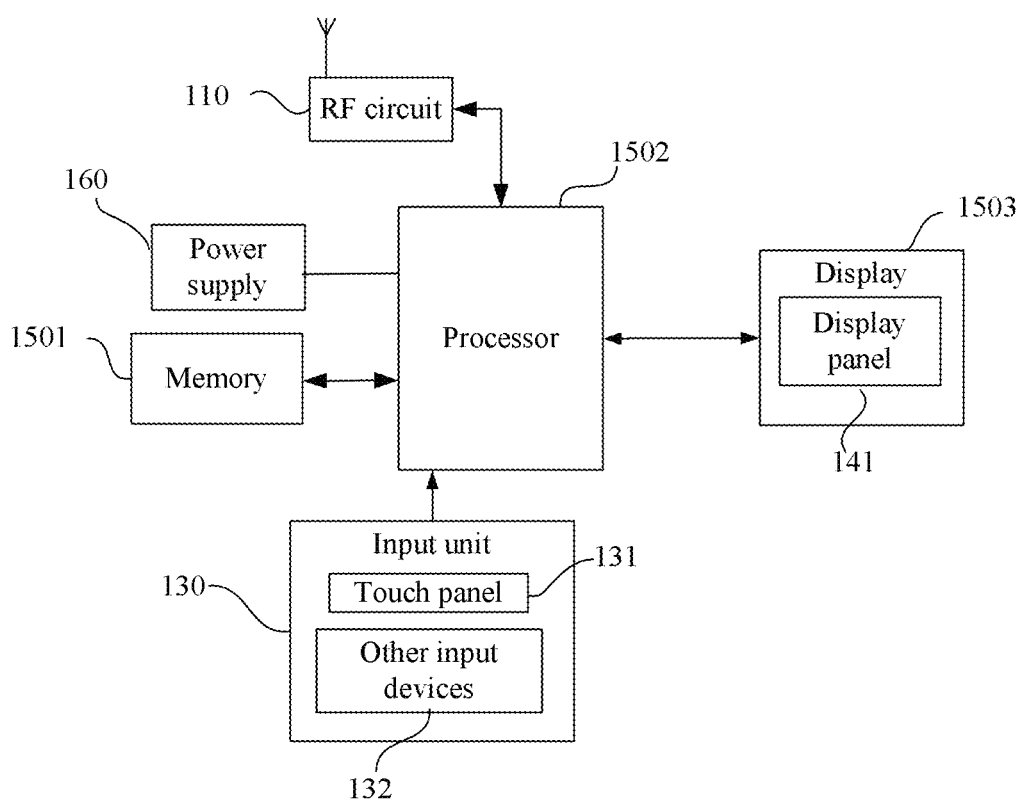
FIG. 15 is another possible schematic structural diagram of a terminal according to an embodiment of the present invention.

When the processing module 1402 is a processor, the display module 1403 is a display, the storage module 1401 is a memory, and the communications module 1404 is a radio frequency circuit, the terminal according to this embodiment of the present invention may be a terminal shown in FIG. 15.

Referring to FIG. 15, the terminal 1500 includes a processor 1502, a display 1503, and a memory 1501. The display 1503, the processor 1502, and the memory 1501 may be connected to each other by using a communication connection.

Referring to FIG. 15, the terminal provided in this embodiment of the present invention includes components such as a radio frequency (English: Radio Frequency, RF) circuit 110, the memory 1501, an input unit 130, the display 1503, the processor 1502, and a power supply 160. A person skilled in the art may understand that a structure of the terminal shown in FIG. 15 does not constitute a limitation on the terminal, and the terminal may include more or fewer components than those shown in the figure, or a combination of some components, or the components disposed differently.

The following describes each component of the terminal in detail with reference to FIG. 15.

The RF circuit 110 may be configured to: receive and send information, for example, exchange information with a device such as a server; and provide received information for the processor 1502 to process. Generally, the RF circuit 110 includes but is not limited to an antenna, at least one amplifier, a transceiver, a coupler, a low noise amplifier (English: Low Noise Amplifier, LNA), a duplexer, and the like. In addition, the RF circuit 110 may also communicate with a network and another device through wireless communication. Any communications standard or protocol may be used for wireless communication, including but not limited to Global System for Mobile Communications (English: Global System of Mobile communication, GSM), general packet radio service (English: General Packet Radio Service, GPRS), Code Division Multiple Access (English: Code Division Multiple Access, CDMA), Wideband Code Division Multiple Access (English: Wideband Code Division Multiple Access, WCDMA), Long Term Evolution (English: Long Term Evolution, LTE), an e-mail, a short message service (Short Messaging Service, SMS), and the like.

The memory 1501 may be configured to store a software program and a module, and the processor 1502 runs the software program and the module stored in the memory 1501, so that the terminal executes the foregoing call record synchronization methods. The memory 1501 may mainly include a program storage area and a data storage area. The program storage area may store an operating system, an application program required to implement the foregoing synchronization methods, and the like. The data storage area may store a call record, and the like. In addition, the memory 1501 may be a volatile memory (English: volatile memory), for example, a random-access memory (English: random-access memory, RAM for short). The memory 1501 may alternatively be a non-volatile memory (English: non-volatile memory), for example, a read-only memory (English: read-only memory, ROM for short), a flash memory (English: flash memory), a hard disk drive (English: hard disk drive, HDD for short), or a solid-state drive (English: solid-state drive, SSD for short). The memory 1501 may further include a combination of the foregoing types of memories.

The input unit 130 may be configured to receive a tap operation or digital or character information entered by a user. Specifically, the input unit 130 may include a touch panel 131 and other input devices 132. The touch panel 131, also referred to as a touchscreen, may collect a touch operation performed by the user on or near the touch panel 131 (for example, an operation performed on the touch panel 131 or near the touch panel 131 by the user by using any suitable object or accessory such as a finger or a stylus), and drive a corresponding connection apparatus according to a preset program. Optionally, the touch panel 131 may include two parts: a touch detection apparatus and a touch controller. The touch detection apparatus detects a touch position of the user, detects a signal generated by a touch operation, and transmits the signal to the touch controller. The touch controller receives touch information from the touch detection apparatus, converts the touch information into touch point coordinates, and sends the touch point coordinates to the processor 1502; and can receive a command sent by the processor 1502 and execute the command. In addition, the input unit 130 may implement the touch panel 131 in a plurality of types, such as a resistive type, a capacitive type, an infrared type, and a surface acoustic wave type. In addition to the touch panel 131, the input unit 130 may further include the other input devices 132. Specifically, the other input devices 132 may include but are not limited to one or more of a physical keyboard, a function key (such as a volume control key or an on/off key), a trackball, a mouse, and a joystick.

The display 1503 may be configured to display information entered by the user, information provided for the user, or the like. The display 1503 may include a display panel 141. Optionally, the display panel 141 may be configured in a form of a liquid crystal display (English: Liquid Crystal Display, LCD), an organic light-emitting diode (English: Organic Light-Emitting Diode, OLED), or the like. Further, the touch panel 131 may cover the display panel 141. After detecting a touch operation on or near the touch panel 131, the touch panel 131 sends the touch operation to the processor 1502 to determine a type of a touch event. Then, the processor 1502 provides corresponding visual output on the display panel 141 based on the type of the touch event. In FIG. 15, the touch panel 131 and the display panel 141 are used as two separate components to implement input and output functions of the terminal. However, in some embodiments, the touch panel 131 may be integrated with the display panel 141 to implement the input and output functions of the terminal.

The processor 1502 is a control center of the terminal, connects various parts of the entire terminal by using various interfaces and lines, and executes the call record synchronization methods by running or executing the software program and/or the module stored in the memory 1501 and invoking data stored in the memory 1501. Optionally, the processor 1502 may include one or more processing units. Preferably, an application processor and a modem processor may be integrated into the processor 1502. The application processor mainly processes an operating system, a user interface, an application program, and the like. The modem processor mainly processes wireless communication. It can be understood that the modem processor may also be not integrated into the processor 1502.

The terminal further includes the power supply 160 (for example, a battery) that supplies power to the components. Preferably, the power supply may be logically connected to the processor 1502 by using a power management system, to implement functions, such as charge management, discharge management, and power consumption management, by using the power management system.

The input unit 130 is configured to receive force touch information of a touch operation of the user. The force touch information includes position coordinate information.

The processor 1502 is configured to: detect an input operation for requesting to display a call record; and after detecting the input operation, control the display 1503 to display a merged call record. The merged call record is a call record obtained after merging of a call record of a first terminal and a call record of a second terminal. The merged call record includes a device identifier of the first terminal and/or a device identifier of the second terminal.

Although not shown, the terminal may further include a camera, a Bluetooth module, a sensor, an audio frequency circuit, a USB module, and the like. Details are not described herein.

Figure 16:
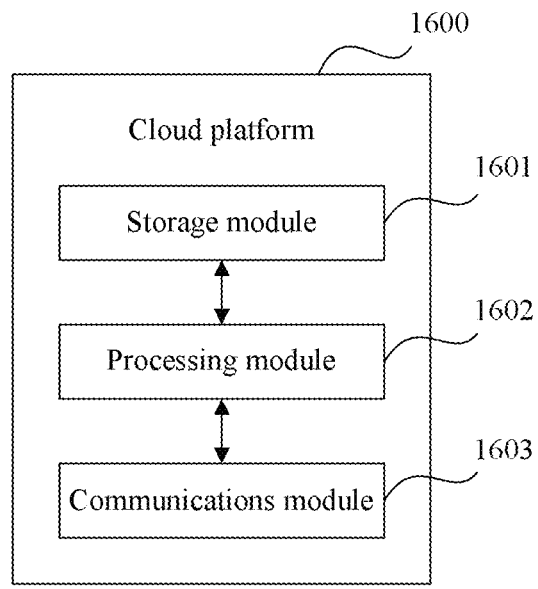
FIG. 16 is a possible schematic structural diagram of a cloud platform according to an embodiment of the present invention.

When the integrated module is used, FIG. 16 is a possible schematic structural diagram of the cloud platform in the foregoing embodiments. A cloud platform 1600 includes a processing module 1602 and a communications module 1603. The processing module 1602 is configured to perform control management on actions of the cloud platform. For example, the processing module 1602 is configured to support the cloud platform in performing the process 3013 in FIG. 5, the process 702 in FIG. 7, the processes 702 and 704 in FIG. 11, and/or another process of the technology described in this specification. The communications module 1603 is configured to support communication between the cloud platform and another network entity, for example, communication between the cloud platform and a terminal. The cloud platform may further include a storage module 1601, configured to store program code and data of the cloud platform.

The processing module 1602 may be a processor or a controller, for example, may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 1602 may implement or execute various example logic blocks, modules, and circuits described with reference to content disclosed in the present invention. Alternatively, the processor may be a combination implementing a computing function, for example, a combination including one or more microprocessors, or a combination of the DSP and a microprocessor. The communications module 1603 may be a communications interface, a transceiver, a transceiver circuit, or the like. The communications interface is a collective term and may include one or more interfaces. The storage module 1601 may be a memory.

Figure 17:
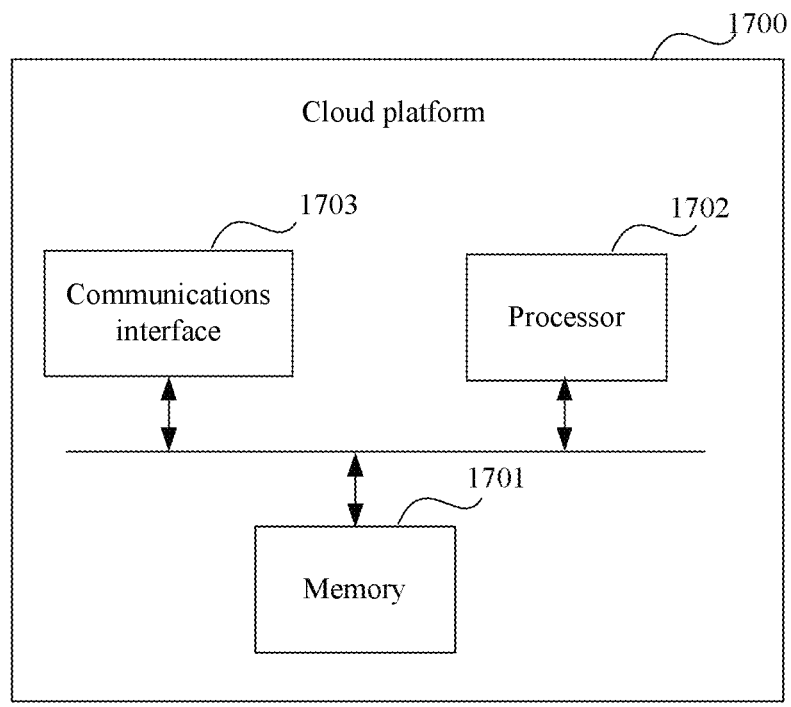
FIG. 17 is another possible schematic structural diagram of a cloud platform according to an embodiment of the present invention.

When the processing module 1602 is a processor, the communications module 1603 is a communications interface, and the storage module 1601 is a memory, the cloud platform according to this embodiment of the present invention may be a cloud platform shown in FIG. 17.

Referring to FIG. 17, the cloud platform 1700 includes a processor 1702, a communications interface 1703, and a memory 1701. The communications interface 1703, the processor 1702, and the memory 1701 may be connected to each other by using a communication connection.

Methods or algorithm steps described with reference to the content disclosed in the present invention may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific implementations. It should be understood that the foregoing descriptions are merely specific implementations of the present invention, but are not intended to limit the protection scope of the present invention. Any modification, equivalent replacement, or improvement made within the spirit and principle of the present invention shall fall within the protection scope of the present invention.

The invention claimed is:

1. A call record synchronization method, comprising:
receiving, by a first terminal, a first incoming call associated with a first phone number;
receiving, by a second terminal, a second incoming call associated with the first phone number while the first terminal is providing a first incoming call prompt of the first incoming call, wherein the first terminal and the second terminal share a same phone number;
receiving, by the first terminal, a first input for answering the first incoming call;
sending, by the first terminal, a call answering notification indicating an answering of the first incoming call by the first terminal;
displaying, by the second terminal, the call answering notification, wherein the call answering notification is displayed as one of a lock screen notification, a notification bar notification and a SMS message;
receiving, by the second terminal, a second input for displaying a first call record; and
displaying, by the second terminal, the first call record in response to the second input, wherein the first call record comprises a first incoming call entry associated with the first incoming call, and wherein the first incoming call entry comprises a first device identifier of the first terminal.

2. The method of claim 1, wherein the first call record further comprises a missed call entry associated with the second incoming call.

3. The method of claim 1, wherein the first terminal is communicatively coupled to the second terminal via a Bluetooth connection.

4. The method of claim 2, wherein the missed call entry comprises a second device identifier of the second terminal.

5. The method of claim 3, further comprising:
receiving, by the second terminal from the first terminal and via the Bluetooth connection, a first piece of call log information of the first terminal; and
generating, by the second terminal, the first call record based on the first piece of call log information.

6. The method of claim 1, further comprising:
receiving, by the second terminal, a second piece of call log information of the first terminal from a cloud server; and
generating, by the second terminal, the first call record based on the second piece of call log information of the first terminal.

7. The method of claim 1, further comprising sending, by the first terminal to the second terminal, a call answering notification indicating an answering of the first incoming call by the first terminal.

8. The method of claim 1, wherein the first call record further comprises an outgoing call entry associated with an outing call performed by the first terminal.

9. The method of claim 8, wherein the outgoing call entry comprises the first device identifier of the first terminal.

10. The method of claim 1, wherein the first call record further comprises incoming call entries and outgoing call entries of the second terminal.

11. A system, comprising:
a first terminal configured to:
receive a first incoming call associated with a first phone number;
receive a first input for answering the first incoming call; and
send a call answering notification indicating an answering of the first incoming call by the first terminal; and
a second terminal communicatively coupled to the first terminal and configured to:
receive a second incoming call associated with the first phone number while the first terminal is providing a first incoming call prompt of the first incoming call, wherein the first terminal and the second terminal share a same phone number;
display the call answering notification, wherein the call answering notification is displayed as one of a lock screen notification, a notification bar notification and a SMS message;
receive a second input for displaying a first call record; and
display the first call record in response to the second input, wherein the first call record comprises a first incoming call entry associated with the first incoming call, and the first incoming call entry comprises a first device identifier of the first terminal.

12. The system of claim 11, wherein the first terminal is communicatively coupled to the second terminal via a Bluetooth connection.

13. The system of claim 12, wherein the second terminal is further configured to:
receive a first piece of call log information of the first terminal from the first terminal via the Bluetooth connection; and
generate the first call record based on the first piece of call log information.

14. The system of claim 11, wherein the first call record further comprises a missed call entry associated with the second incoming call.

15. The system of claim 14, wherein the missed call entry comprises a second device identifier of the second terminal.

16. The system of claim 11, wherein the second terminal is further configured to:
receive a second piece of call log information of the first terminal from a cloud server; and
generate the first call record based on the second piece of call log information of the first terminal.

17. The system of claim 11, wherein the first terminal is further configured to send, to the second terminal, a call answering notification indicating an answering of the first incoming call by the first terminal.

18. The system of claim 11, wherein the first call record further comprises an outgoing call entry associated with an outgoing call performed by the first terminal.

19. The system of claim 18, wherein the outgoing call entry comprises the first device identifier of the first terminal.

20. The system of claim 11, wherein the first call record further comprises incoming call entries and outgoing call entries of the second terminal.

* * * * *